United States Patent [19]

Bravenec et al.

[11] Patent Number: 4,519,974
[45] Date of Patent: May 28, 1985

[54] METHOD AND APPARATUS FOR APPLYING A SEALANT TO EXPOSED FASTENERS

[75] Inventors: Thomas H. Bravenec, Bedford; Roger L. Boyd, Mesquite; Robert R. Ferenc, Dallas, all of Tex.

[73] Assignee: LTV Aerospace and Defense Company, Dallas, Tex.

[21] Appl. No.: 522,711

[22] Filed: Aug. 12, 1983

[51] Int. Cl.³ .............................................. B29C 1/00
[52] U.S. Cl. .................................. 264/279; 249/117; 249/134; 264/334; 425/436 R
[58] Field of Search .................. 249/134, 135, 117; 264/261–263, 259, 271.1, 279, 334; 30/301, 314, 315, 298; 52/716; 411/371, 373, 377; 425/436 R

[56] References Cited

U.S. PATENT DOCUMENTS

| | | | |
|---|---|---|---|
| 1,556,029 | 10/1925 | Reagan | 264/262 |
| 2,010,934 | 8/1935 | Smith | 264/262 |
| 2,135,326 | 11/1938 | Calland | 264/262 |
| 2,208,732 | 7/1940 | Powell | 29/460 |
| 2,694,987 | 11/1954 | Kappler | 30/316 |
| 3,217,617 | 11/1965 | Wiswell | 264/31 |
| 3,298,272 | 1/1967 | Henderson | 411/373 |
| 3,470,787 | 10/1969 | Mackie | 411/377 |
| 3,885,492 | 5/1975 | Gutshall | 411/373 |
| 3,957,560 | 5/1976 | Le Bon | 156/493 |
| 4,135,476 | 1/1979 | Duryea | 118/259 |
| 4,144,625 | 3/1979 | Hogenhout | 29/34 B |
| 4,382,049 | 5/1983 | Hofmeister et al. | 264/268 |

FOREIGN PATENT DOCUMENTS 1397500  3/1965  France ............................. 411/373

*Primary Examiner*—Willard E. Hoag
*Attorney, Agent, or Firm*—Thomas F. Daley

[57] ABSTRACT

A method and apparatus for applying a uniform sealant coating over the portion of a fastener (14) exposed above a panel (10, 12) includes depositing an amount of uncured sealant (S) in a cavity (44) in a sealant retaining shell (40). The shell and sealant is applied over the exposed portion (22) of the fastener (14) and the retaining shell is brought into contact with the panel such that the uncured sealant is entrapped between the shell and the exposed portion of the fastener and the panel. As descent is made onto the fastener, a slight rotating motion may be used to adjust the sealant around the fastener equally. The sealant is allowed to cure and thereafter the shell is removed leaving a uniform sealant coating over the fastener exposed end.

15 Claims, 11 Drawing Figures

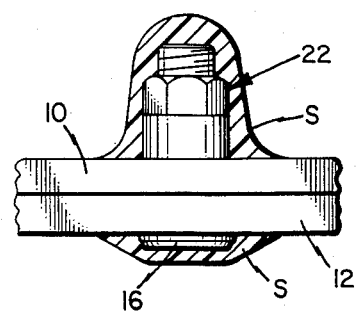
FIG. 5
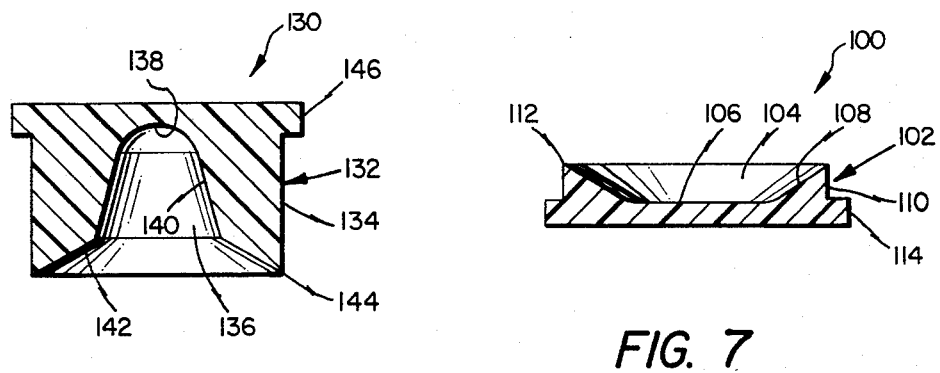
FIG. 6
FIG. 7
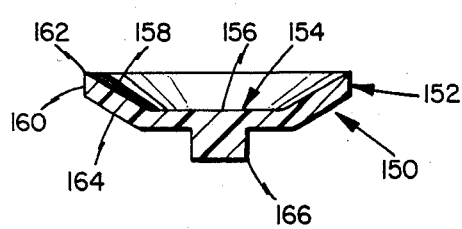
FIG. 8
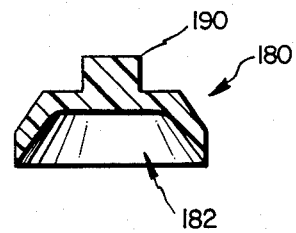
FIG. 9

४,५१९,९७४

METHOD AND APPARATUS FOR APPLYING A SEALANT TO EXPOSED FASTENERS

TECHNICAL FIELD

The present invention relates to a method and apparatus for electrically insulating, sealing and providing corrosion resistance to exposed fasteners and more particularly to a method and apparatus which accomplishes these features by applying a sealant to the fasteners.

BACKGROUND ART

In machine construction using rivets, bolts, fasteners and other means of attachment, it is often beneficial to apply a sealant to the exposed portion of the fasteners to protect it from corrosion and to provide electrical insulation. The sealant can also function to seal around the fasteners.

In the manufacture of production aircraft, it is often required that the rivets, bolts, fasteners and other protrusions be covered with a curable sealant to prevent corrosion and to provide electrical insulation. Conventionally, elastomeric sealant has been applied by directing the uncured sealant directly onto the individual fasteners such as by use of brush or stick applicator and permitting the sealant to cure. This has been found to provide inconsistent results in that the uncured sealant, normally a polyurethane resin, is not uniformly applied and tends to sag or deform from a symmetrical configuration prior to curing. This inconsistency in the resulting sealant coatings accomplished by the prior art methods has resulted in thin and nonuniform regions over the outer surfaces of the fasteners, where specific minimum thicknesses for the sealant are required, it has been difficult to consistently maintain such standards using the prior art methods.

Thus, a need exists for an improved method of applying a sealant coating to the exposed portion of fasteners, or other similar elements, which provides a consistent coating of predefined minimum thicknesses at required points.

The present invention provides a method and apparatus for applying a uniform sealant coating over the portion of a rivet, bolt, fastener or other element exposed above a surface. The sealant coating prohibits corrosion, provides electrical insulation and seals the fastener and the surrounding area. The method of the present invention provides for applying the sealant using a cup-shaped molding shell loaded with an appropriate amount of uncured sealant. The shell and sealant are applied over the exposed portion of the fastener or other element and are brought into contact with the panel or other surface such that the uncured sealant is entrapped between the exposed portion of the fastener and the shell thereby covering the exposed portion of the fasteners with sealant. The sealant is then allowed to cure and the molding shell is removed.

In the preferred embodiment, the molding shell is placed coaxially over the fastener or other element such that the sealant uniformly covers the fastener providing a uniform coat of sealant therearound. Further, a measured quantity of uncured sealant is loaded into the molding shell substantially equal to the difference in the volume of the interior cavity of the shell and the volume of the exposed portion of the fastener such that the sealant completely fills the area between the fastener and the molding shell interior cavity, without excess sealant, when applied.

The present invention also is directed to the molding shells used to apply the sealant to the fastener which include a surface for engagement with the panel adjacent the exposed portion of the fastener, such surface defining the opening to the interior cavity within the shell corresponding to the desired configuration for the sealant cover to be applied to the exposed fastener. In one embodiment of the invention, the molding shell includes a head portion attached to the shell body for providing means for gripping the body to facilitate removal subsequent to curing of the sealant. The molding shell may have a substantially cylindrical exterior side wall with a pre-determined contoured interior to define the exterior of the sealant to be applied. The exterior wall and the contoured interior meet to define a panel engaging annular ring at the base of the shell. The molding shell may also incorporate an internally beveled, annular lower edge to define an outwardly extending skirt at the base of the formed sealant to be applied to the fastener.

In one embodiment, the head portion of the molding shell has an indention therein to remove unnecessary material and thereby reduce the weight of the shell while maintaining the gripping means provided by the head portion. The gripping means preferably incorporates an annular flange extending outwardly from the shell body. In another embodiment, the gripping means comprises a nipple extending from the molding shell to facilitate gripping of the shell.

Although the present invention is described as used to apply a sealant cover to the exposed portions of a fastener extending through and attaching a pair of panels, it will be understood by those skilled in the art, that the present method and apparatus may be used to cover any other protrusion from a panel whether the protrusion be a fastener or otherwise. Only the shape and contour of the molding shells need be changed to apply the present method and apparatus to use for other protrusions which are to be electrically insulated, protected from corrosion, sealed or otherwise covered with a sealant.

BRIEF DESCRIPTION OF THE DRAWINGS

For a more complete understanding of the present invention and for further details and advantages thereof, reference is now made to the following Detailed Description taken in conjunction with the accompanying Drawings, in which:

FIG. 3b and 3c are enlarged views of alternative designs of the body engaging portion of the molding shell shown in FIG. 3a;

FIG. 4 is a vertical section of the head and tail molding shells applied to a fastener;

FIG. 5 is a section view of the sealed fastener with the molding shells removed;

FIGS. 6 and 7 show, in section view, a first alternative tail and head molding shells used in the present invention; and FIGS. 8 and 9 show, in section view, a second alternative head and tail molding shells used in the present invention.

DETAILED DESCRIPTION

Figure 1:
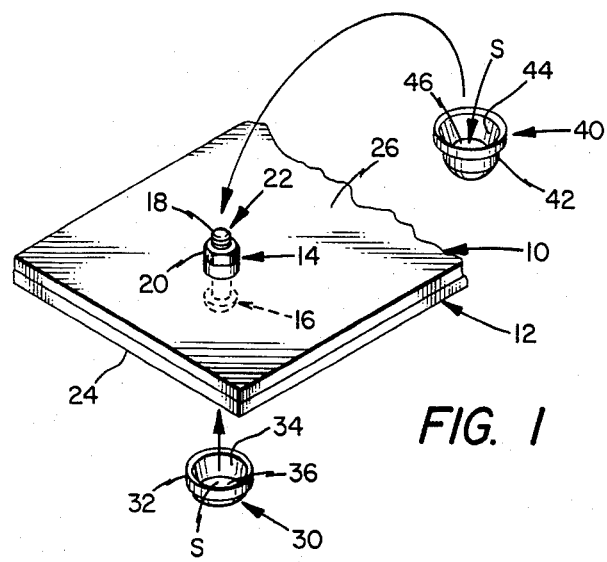
FIG. 1 is a perspective view showing molding shells being positioned to apply a sealant to the head and tail of a fastener attached through panels.

The present invention relates to a method and apparatus for applying a sealant to the head and tail end of a fastener exposed above a panel to which the fastener is attached. FIG. 1 illustrates panels 10 and 12 attached by threaded fastener 14 having a head 16, a threaded end 18 and a nut 20 threaded on end 18. The head 16 and the tail end 22, represented by threaded end 18 and nut 20, are exposed above the surface 24 of panel 12 and surface 26 of panel 10, respectively.

The present invention incorporates a head end molding shell 30 having a substantially cup-shaped configuration having a cylindrical outer sidewall 32 with a sealant receiving cavity 34 therein. As can be seen in FIG. 1, shell 30 is filled with a sealant S to a level indicated by 36. A tail molding shell 40 is used for applying sealant to the tail end of fastener 14 and includes a substantially cylindrical outer wall 42 with a sealant receiving cavity 44. Cavity 44, as shown in FIG. 1, receives a level of sealant S as indicated by level 46.

The sealant used in the present invention may vary from application to application. When the present invention is used to seal fasteners used on production aircraft, the following materials may be used according to the specifications required: Material No. 899-B-2, produced by Essex Chemical Corporation, Pro-Seal Division, 19451 Susana, Compton, Calif. 90221; Material No. 579-B-2, manufactured by Goal Chemical Sealants Corporation, 3137 East 26th Street, Los Angeles, Calif. 90023; Materials 1750-B2 and 595-B2, manufactured by Products Research and Chemicals Corporation, 5430 San Fernando Road, Glendale, Calif. 91203.)

Figures 2, 3A:
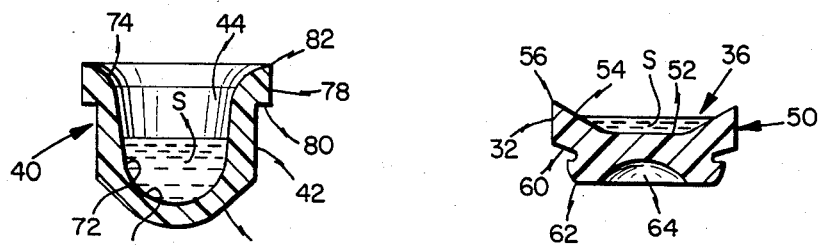
FIG. 2 is a vertical section view of a tail molding shell with sealant loaded therein.
FIG. 3a is a vertical section view of a head molding shell with sealant loaded therein.
Figures 3B, 3C, 4:
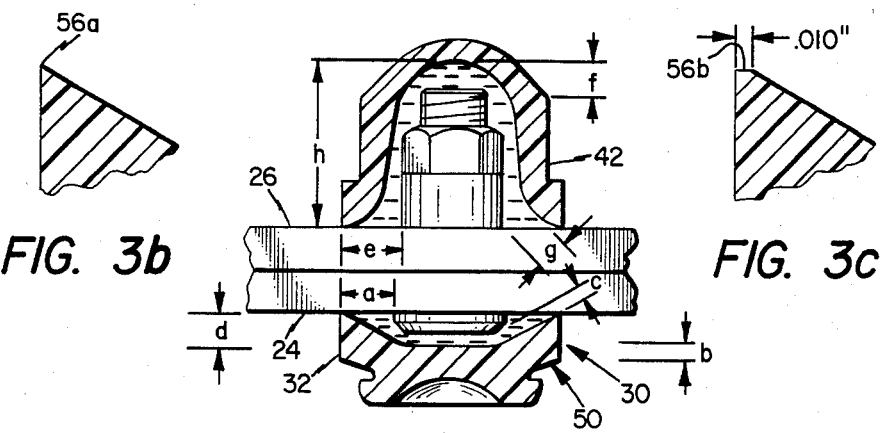

FIGS. 2 and 3a illustrate the head and tail molding shells 30 and 40, respectively, in more detail. FIGS. 2 and 3a shows the head and tail molding shells 36 and 40 loaded with an appropriate amount of sealant S and prior to being applied to the fastener. Head molding shell 30 includes a body 50 having a cavity 36 formed therein. Cavity 36 has a bottom 52 and a beveled sidewall 54 which joins cylindrical outer sidewall 32 to define an annular edge 56. As can be seen in the detail of FIG. 3b and 3c, edge 56 may be formed as a knife edge 56a (FIG. 3b) or to provide a flat 56b (FIG. 3c). Where a flat is provided such as that shown in FIG. 2b, 0.010 inch has been determined to be the preferred dimension.

Body 50 has an annular beveled shoulder 60 which joins body 50 to a gripping flanged head 62. Flanged head 62 has a spherical cutout or indentation 64 formed therein to reduce the weight of the overall molding shell while continuing to provide a flange to facilitate gripping of the shell.

Referring to FIG. 1 in conjunction with FIG. 4, molding shell 30 is used to apply a uniform coat of sealant over head 16 of bolt 14 by metering a predetermined amount of sealant S into cavity 36. An amount of sealant is metered into cavity 36 substantially equal to the difference in the volume of the cavity 36 and the volume of the head 16 of bolt 14. Thus, when molding shell 30 is applied over head 16 such that edge 56 is brought in to contact surface 24 of panel 12, sealant S completely fills the area between the shell and head 16 without any appreciable amount of sealant being forced out of cavity 36. However, a sufficient amount of sealant is included in the cavity to completely fill the area between the shell and the head of the fastener. As descent is made onto the fastener, the molding shell may be slightly rotated to help adjust the sealant around the fastener equally as well as to facilitate centering of the shell over the fastener.

As will be noticed in FIG. 4, with the molding shell 30 coaxially positioned over head 16, a uniform dome shaped sealant cover is applied over the head and the surrounding area of panel 12. The thickness of the dome-shaped sealant cap may be varied in thickness at any point by varying the contour and dimensions of cavity 36. As is common in applying sealant to fasteners in production aircraft, minimum dimensions as identified by the dimensions "a", "b", "c" and "d" must be met. By merely controlling the contour and dimensions of cavity 36, each of these minimum dimensions may be readily met without the need to apply sealant to a greater thickness than is required.

Referring to FIG. 2, tail molding shell 40 includes a contoured cavity 44 therein having a circular bottom 70 with a first tapered annular wall 72 merging to a more extreme tapered second wall 74. The exterior of molding shell 40 is generally cup shaped having a domed top 76 joining a substantially cylindrical side wall 42 with a lower flange 78 joined thereto by a step 80. Second wall 74 of cavity 44 joins flange 78 at an annular edge 82.

The use and application of molding shell 40 is similar to that discussed above with respect to head molding shell 30. A sufficient amount of sealant S is metered into cavity 44, such amount substantially equaling the difference in the volume of cavity 44 and that of the tail 22 of fastener 14. The molding shell 40 is then applied coaxially over tail 22 of fastener 14 and centered thereover such that edge 82 engages surface 46 of panel 10. Sealant S is entrapped between shell 40 and tail 22 to apply a uniform coat of sealant over the tail of fastener 14 and the adjacent area on panel 10. As the molding shell is applied, a slight rotating motion may be used to adjust the sealant around the fastener equally and to facilitate centering of the molding shell over the fastener.

As described with respect to head molding shell 30, the cavity 44 is appropriately contoured and dimensioned such that the sealant cover has sufficient thicknesses at points designated by "e", "f", "g" and "h" to meet the requirements set for a particular application. These dimensions may be readily altered by merely changing the configuration or the dimension of cavity 44. It will further be appreciated that whether the molding shell is applied upright, such as with respect to molding shell 40, or inverted, such as with molding shell 30, sagging or other movement of the sealant prior to curing is obviated in view of the molding function provided by the shells. In view of the consistency and the adhesion properties provided by the sealant, it has been found that the molding shells may be applied in either the upright or inverted positions as shown in FIG. 3 without movement of the shells or sealant.

The removal of material from molding shell 30 as represented by indention 64 reduces the weight of the shell and thereby further eliminates the possibility of movement of the shell under the action of gravity when applied in the inverted position as shown.

Subsequent to curing of the sealant, the molding shells are moved merely by grasping the shells and applying an appropriate force to dislocate the shells relative to the cured sealant. In one embodiment of the invention, the shells are formed with a smooth inner surface to facilitate removal. Further, the shells are preferably manufactured from polyethylene, such as by injection molding, but may be made from any number of other materials, using other means of manufacturing, including machining of the shells. In the preferred embodiment, the polyethylene shells are substantially rigid although more resilient shells may be used as a suitable alternative.

FIG. 5 shows fastener 14 covered with the cured sealant subsequent to the removal of the molding shells 30 and 40. As can be seen, an appropriate coating with a uniform contour is formed over the fastener head and tail thereby avoiding thin points of coverage as is sometimes experienced using prior art methods of applying the sealant.

FIGS. 6 and 7 show alternative configurations for the molding shells. However, it will be recognized by those skilled in the art that any number of configurations can be adopted without departing from the method of the present invention. Referring to FIG. 7, head molding shell 100 includes a body portion 102 having a cavity 104 formed therein. Cavity 104 has a bottom 106 and a beveled sidewall 108. Body portion of the shell has a cylindrical outer wall 110 which joins cavity side wall 108 to define an annular edge 112. An annular flange 114 extends from body 102 to facilitate removal of the shell. Tail molding shell 130 is shown in FIG. 6 and includes a body portion 132 having a cylindrical sidewall 134 and an inner cavity 136 having a domed bottom 138 a first annular tapered sidewall 140 and a second tapered sidewall 142. Exterior sidewall 132 and second sidewall 142 connect to define an annular edge 144. An annular flange 146 extends from body portion 132 and facilitates gripping of the shell to assist in removal subsequent to curing of the sealant.

FIGS. 8 and 9 show a second alternative configuration for the molding shell used to apply sealant to the head and tail of a fastener. Head molding shell 150 (FIG. 8) includes a body 152 having a cavity 154 formed therein. Cavity 154 has a bottom 156 and a beveled sidewall 158 which joins cylindrical outer sidewall 160 to define an annular edge 162. Body 152 includes tapered side walls 164. A nipple 166 extends from body 162 to provide for gripping of the molding shell for application and removal. Tail molding shell 180 has a configuration similar to head molding shell 150 including a body 182 having a cavity 184 formed therein. A nipple 190 extends from body 182 to facilitate gripping of the shell.

Thus, the present invention provides an improved method and structure for applying a uniform layer of sealant over the head and tail of fasteners used in manufacture of production aircraft. The present method includes metering a pre-determined amount of uncured sealant into the cavity provided in a molding shell and coaxially mounting the shell with sealant therein over the object to be coated. An appropriate amount of sealant is metered to the cavity to assure complete filling of the area between the inner cavity of the shell and the object to be coated and its surrounding surface. The sealant is then allowed to cure and the shell is removed leaving a uniform coating on the object.

Although the primary embodiment has been described as being applicable in this application, it will be readily appreciated that the present invention may be incorporated in any type of manufacture or construction where a sealant is to be applied over a fastener. Further, the present invention may also be applied where a sealant is to be uniformly applied over any protrusion from a surface, whether the surface be planar, such as in the case of an aircraft panel, or irregular in shape. The only modification which would be required is contouring of the molding shells to provide for seating of the shell to the surface adjacent the object to be covered. Alternatively, the shell might also be designed for engagement with the object itself where sealant is not required on any surface adjacent to the object covered.

Although preferred embodiments of the invention have been described in the foregoing Detailed Description and illustrated in the accompanying Drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modifications and substitutions of parts and elements as fall within the spirit and scope of the invention.

We claim:

1. A method of applying a sealant over an object comprising: depositing in the interior cavity of a rigid sealant-retaining shell an amount of sealant substantially equal to the difference in the volume of the interior cavity of the shell and the volume of the object to be covered; applying the shell and sealant over the object rotating the shell with the boundary of the shell in contact with the object; while said shell is disposed adjacent said object allowing the sealant to cure; removing the shell after the sealant has cured said applying including gripping a flange extending radially from said shell and spaced from portions of said shell defining a mouth.

2. The method according to claim 1 wherein the shell has a pre-determined interior configuration and volume.

3. A method of applying a sealant to the exposed portion of a fastener comprising: loading a predetermined amount of sealant in an interior cavity of a sealant retaining shell; depositing in an interior cavity of a sealant-retaining shell an amount of sealant substantially equal to the difference in the volume of the interior cavity of the shell and the volume of the exposed portion of the fastener; applying the shell and sealant over the exposed portion of the fastener such that the sealant is contained around the exposed portion of the fastener; allowing the sealant to cure, said applying including gripping a radially extending flange spaced from portions of said shell defining a mouth.

4. The method according to claim 3 further comprising:
rotating the shell when applying the shell and sealant over the fastener.

5. The method according to claim 3 further comprising:
removing the shell after the sealant has cured.

6. A method of applying a sealant to cover the portion of a fastener exposed above a panel to which the fastener is attached and the point of engagement of the fastener with the panel comprising: depositing an amount of uncured sealant in a cavity formed in a rigid sealant-retaining shell, applying the shell and sealant over the exposed portion of the fastener and bringing the reatining shell into contact with the panel such that the uncured sealant is entrapped between the exposed portion of the fastener and panel and the shell thereby covering the exposed portion of the fastener and the point of engagement of the fastener with the panel with sealant and allowing the sealant to cure, said applying including gripping a flange extending radially from said shell and spaced from shell portions defining a mouth.

7. The method according to claim 5 further comprising:
rotating the shell while applying the shell over the fastener.

8. The method according to claim 6 wherein said loading comprises:
metering an amount of sealant in the shell cavity substantially equal to the difference in the volume of the interior cavity of the shell and the volume of the exposed portion of the fastener.

9. The method according to claim 6 further comprising:
removing the shell after the sealant has cured.

10. The method according to claim 6 wherein the shell has a pre-determined interior configuration and volume.

11. The method according to claim 6 further comprising:
centering the shell over the exposed portion of the fastener prior to the curing of the sealant to provide a uniform sealant coat around the fastener and at the point of engagement of the fastener with the panel.

12. A sealant applicator for applying a sealant to the portion of a fastener exposed above a panel to which the fastener is attached comprising: a molding shell having a surface for engagement with the panel adjacent the exposed portion of the fastener, said surface defining the mouth of an interior cavity within the shell, said cavity corresponding to the desired configuration for the sealant to cover to be applied to the exposed fastener; and a head portion attached to said shell comprising means for gripping said shell, said shell and spaced from a portion of said shell defining said mouth, said head portion having a concave or a flat top configuration.

13. The applicator according to claim 12 wherein said interior cavity and the exterior sidewall of the applicator meet to define an annular edge at the base of the applicator.

14. The applicator according to claim 13 wherein said interior cavity and said exterior sidewall meet to define an annular edge at the base of the applicator.

15. The applicator according to claim 14 wherein said annular edge is substantially a knife edge.

* * * * *